United States Patent [19]

Lance

[11] Patent Number: 4,674,471
[45] Date of Patent: Jun. 23, 1987

[54] CLAMP FOR CONNECTING A FISHING REEL TO A BOW

[76] Inventor: Stanley Lance, 21003 E. 36th Pl., Broken Arrow, Okla. 74012

[21] Appl. No.: 759,862

[22] Filed: Jul. 29, 1985

[51] Int. Cl.$^4$ .................... F41B 5/00; A01K 91/02; A47B 96/06
[52] U.S. Cl. ........................ 124/86; 43/19; 242/106; 248/231.8; 124/88
[58] Field of Search ............ 124/80, 88, 23 R, 23 A, 124/24 R, 24 A; 43/19; 248/231.8; 224/916; 242/106

[56] References Cited

U.S. PATENT DOCUMENTS 3,366,101  1/1968  Saunders .................. 124/88
3,522,916  8/1970  Saunders .................. 124/23 R
3,669,394  6/1972  Loucks .................. 248/231.8

Primary Examiner—Richard C. Pinkham
Assistant Examiner—Benjamin Layno
Attorney, Agent, or Firm—Head John Stevenson

[57] ABSTRACT

A special clamping mechanism is disclosed for holding a reel to a bow for use in bow fishing which can be attached to a bow without screws, bolts or the like. It includes an upper clamp and a lower clamp, each clamp wrapping around the bow in a unique manner and is made of one continuous piece. A reel support member is attached to the clamping mechanism. A shooting strap is connected to the bow next to the spot thereon where the holding hand grasps the bow.

4 Claims, 9 Drawing Figures

Fig. 7 PRIOR DISCLOSURE

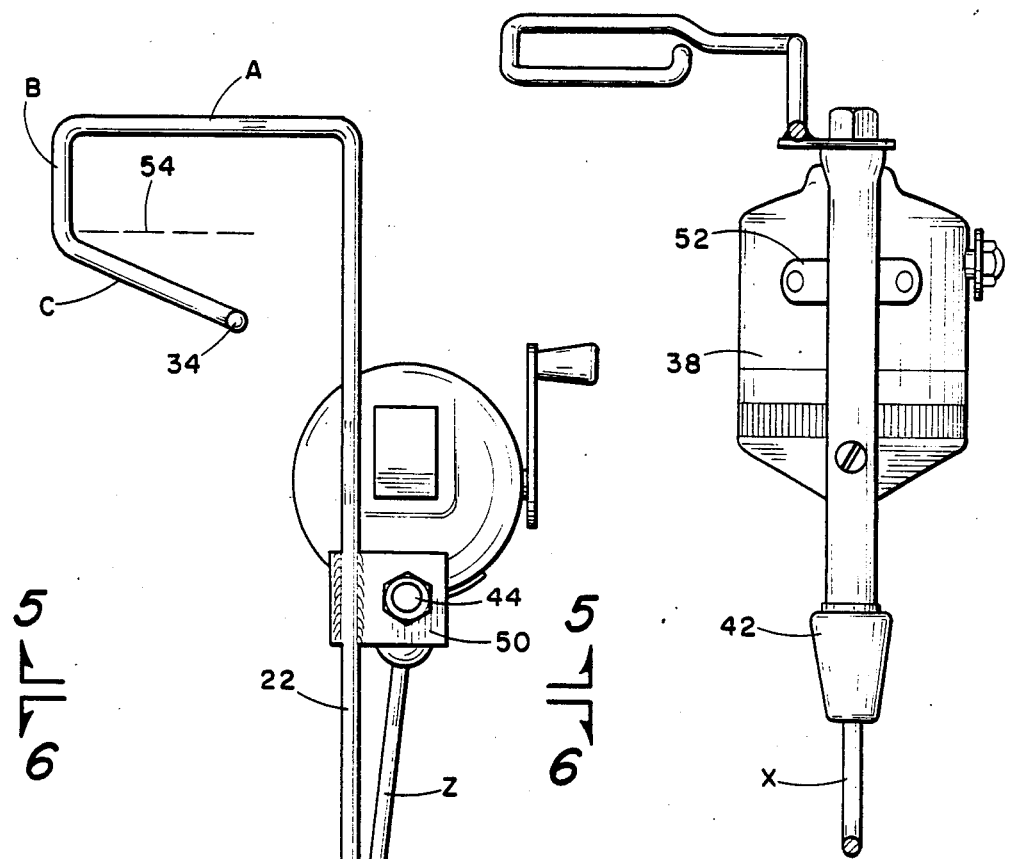
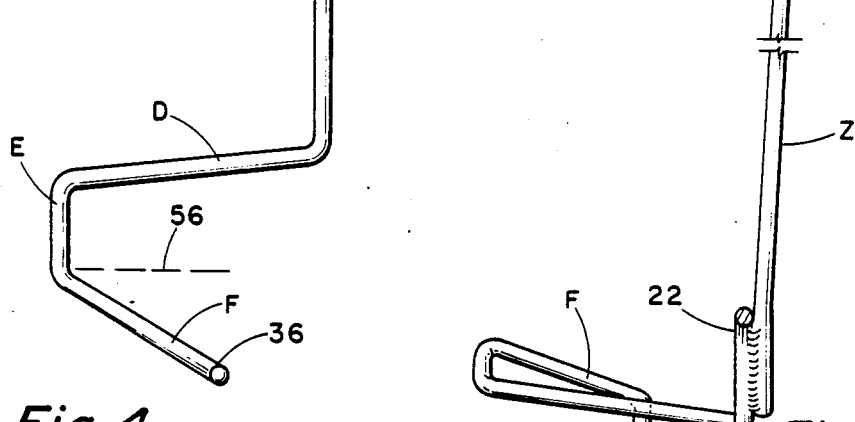
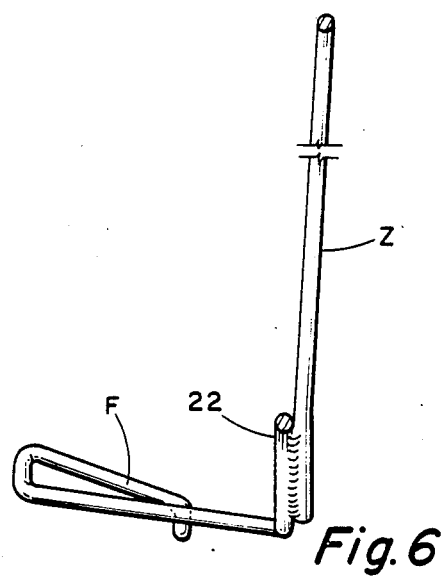
Fig. 4
Fig. 5
Fig. 6

PRIOR DISCLOSURE

PRIOR DISCLOSURE

CLAMP FOR CONNECTING A FISHING REEL TO A BOW

BACKGROUND OF THE INVENTION

1. Field of the Invention.

This invention relates to bow fishing. It particularly relates to a clamp mechanism for holding a reel to a bow and also inclues a shooting strap for use in conjunction therewith.

2. Prior Disclosures.

The sport of bow fishing is widespread. It includes connecting a reel in some manner to a bow and connecting the arrow to the string of the reel. The arrow is shot toward a fish and the reel is unwound taking the string with the arrow. If the bow fisher is fortunate, his arrow will hit a fish and the fish will put an outward force on the reel and he will then be required to reel in the fish. the following patents relate to the concept of removably attaching a reel to a bow for bow fishing: U.S. Pat. Nos. 3,949,730; 3,084,467; 3,377,999; 2,808,043; 3,314,186; 3,500,571; 4,024,667; 3,059,370; 3,355,836; 3,129,525. U.S. Pat. No. 2,464,068 appears on a quiver holder attachably mounted on a bow is of interest.

SUMMARY OF THE INVENTION

This is a wire fastener or clamp mechanism for connecting a reel to a bow without use of screws or bolts. It includes a stiff continuous wire shaped to have an upper clamp and a lower clamp joined by a connecting section of wire. The upper clamp is a continuation of the connecting wire section and has a first section A essentially perpendicular to the straight section and goes across the back side of the bow. The end of the first section is connected to a second section B which is essentially parallel to the straight section and goes along the side of the bow and extends back in the general direction of the connecting wire section. This connects into a third section C which goes across the front of the bow and preferably makes an angle of about 130° with the second section. These three sections are each essentially straight. The lower clamp has a first straight section D which is a continuation of the lower end of the connecting section and goes behind the bow. There is a straight section E which is a continuation of section D which is perpendicular thereto and which is connected to a section F which goes in front of the bow. The front of the bow is the side of the bow that faces away from the shooter when the bow is in the shooting position. A reel support bracket is mounted on the connecting section. The force from the line caused by a sporting fish is through the center line of the reel which is above the center of the bow and is above the center of the connecting section between the upper and lower clamps. The particular shape of my upper clamp and my lower clamp secures the reel to the bow even though there may be great force applied to the reel.

In conjuction with the above embodiment, I also provide a shooting strap which includes a base strap which is that part which goes around the bow and is securely fastened thereto and an adjustable wrist strap. The wrist strap is attached to the base strap by a D-ring along which the strap can slide up and down, thus, the shooting strap is not rigid and it permits the bow to float in the hands. This technique will greatly improve the accuracy of the arrow and also allow the bow to absorb its own shock load.

It is an object of this invention to provide a novel way of securely anchoring a reel for bow fishing to a bow without using screws or bolts.

Various other objects and a better understanding of the invention can be had from the following description taken in conjunction with the drawings.

BRIEF DESCRIPTION OF THE DRAWINGS

FIG. 4 is a view taken along the line 4—4 of FIG. 2.

FIG. 5 is a view taken along the line 5—5 of FIG. 4.

FIG. 6 is a view taken along the line 6—6 of FIG. 4.

FIG. 7 is a view of a prior disclosure of a clamp for holding a quiver to a bow.

DETAILED DESCRIPTION OF THE PREFERRED EMBODIMENT

Figure 1:
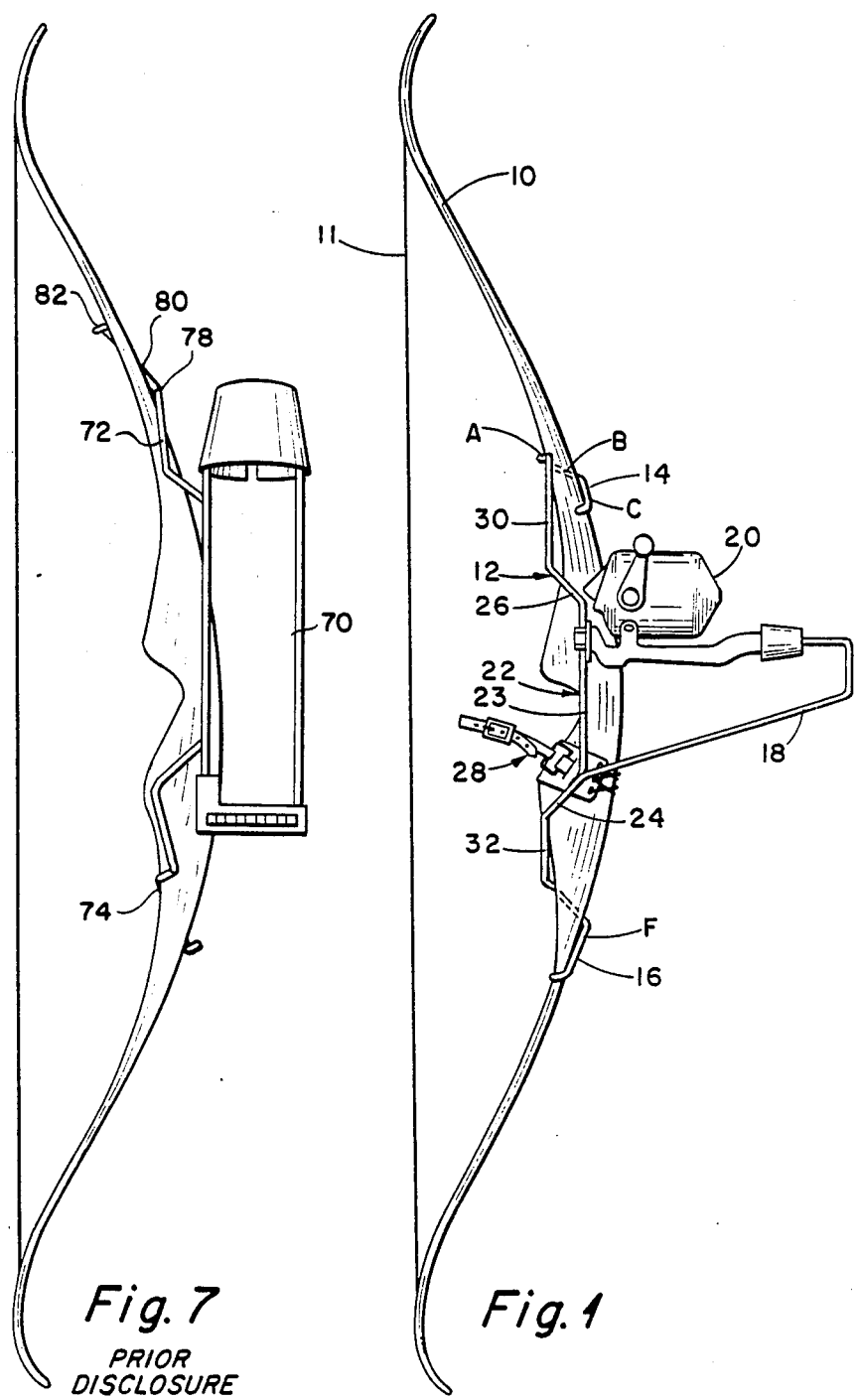
FIG. 1 illustrates the wire fastener of my invention holding a reel to a bow and also showing the shooting strap also mounted to the bow.

Attention is first directed to FIG. 1 which shows my invention mounted upon a bow 10 having a string 11. The wire fastener 12 includes an upper clamp 14 and a lower clamp 16 connected by a connecting section 22 having indented portions 24 and 26 so that the reel can be properly positioned on support section 23. The wire fastener supports a bracket 18 upon which is mounted reel 20. Also shown in FIG. 1 is a shooting strap 28.

Figures 2, 3:
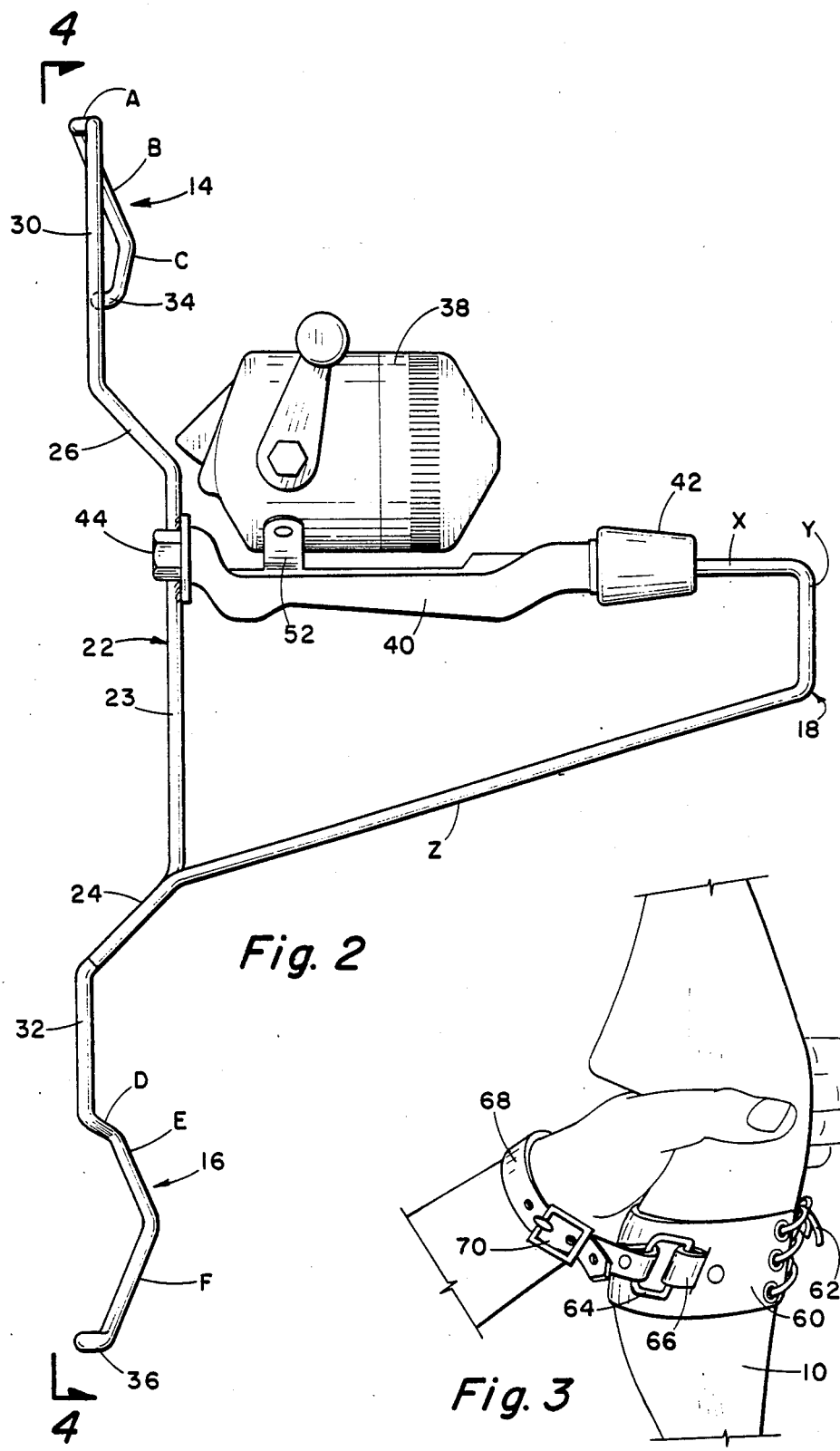
FIG. 2 shows an enlarged view of my novel wire fastener removed from the bow and supporting a reel.
FIG. 3 shows an enlarged view of the shooting strap.

Attention will now also be directed toward FIGS. 2, 4 and 5 in relation to FIG. 1 for a more detailed discussion of the wire fastener. As just described, the wire fastener includes an upper clamp 14, a lower clamp 16 and a connecting section 22. The upper clamp 14 includes a horizontal section A which connects to the end of upper straight section 30 of connection section 22. Section A goes laterally across ahd behind the bow when installed. The front side of the bow is considered that portion in the direction of which the arrow will be shot. A section B is essentially perpendicular to section A and goes along the side of the bow. Section C goes across in front of the bow and has a slight hook 34 for securing it to the edge of the bow. It is preferred that section C slope downwardly between about 30° and 45°. The lower end of connection section 22 is a straight section 32 which connects to the lower clamp 16 which includes an essentially horizontal section D which goes behind and across the bow, a vertical section E which goes along the side of the bow and section F which goes in front of the bow. Section F also has a small hook 36 similar to 34.

A bracket 18 is attachable to connecting section 22 for supporting a commercially available reel 38. A reel holding bracket 40 is provided between connector 42 and nut 44. Nut 44 connects the reel bracket 40 to plate 50 of connecting section 22 of the wire fastener (FIG. 4). Bracket 18 includes sections X,Y and Z. Reel bracket 40 is connected to bracket 18 by connector 42. Bracket 18 also has sections X, Y and Z which preferably takes on exxentially the configuration shown in FIG. 2. As shown in FIG. 4, the preferred way of mounting reel bracket 40 to the connecting section 22 is by a bracket plate 50 welded to section 22 then a bolt 44 can connect the plate 50 to the cradle 40 which can be attached to wings 52 to the reel 38. Section Z can be welded to section 22 as shown in FIGS. 6 and 4.

I have built a wire fastener or clamping mechanism as just described and I have built it out of stiff wire which was made of steel. The following shows the approximate length of the various sections of this. Section A is 2½" long; B is 1¾"; C is 2½"; D is 3¼"; E is 1½"; F is 2½". Section 22 has a vertical section 23 of 6" and section 24 of 1⅜" and section 26 of 1¾". Sections 30 and 32 are respectively 4" and 2¾". Section 24 makes an angle of about 135° with section 23 and section 26 makes an angle of about 135° with section 23. It is to be noted that in this description, we have used vertical and horizontal for ease of description and to simplify the description of the way the fastener would be attached to the bow when the bow is in the upright shooting or operating position. This is merely for convenience and ease of description. Section C makes an angle of about 30° with the horizontal and section F also makes an angle of about 30° with the horizontal line indicated by lines 54 and 56 respectively. This angle of approximately 30° may be up to 45° and it gives the clamp more area to clamp on the bow which secures it better and helps prevent twisting. The dimensions given are typical but do not limit my invention.

In operation, the reel is mounted using the wire fastener as shown above and it can be readily attached to a bow by merely manipulating the wire sections of upper clamp 14 and the wire sections of lower clamp 16 about the bow as indicated. When the bow is used to shoot an arrow and a fish is speared by the arrow, the force from the line is through the center line of the reel. This center line of the reel is above the center of the bow and is also above the center of the wire fastener. Thus, the reel clamp tends to pivot about the lower end or the lower clamp 16. My upper clamp is such that it will securely hold the reel. This is due to the fact that section C of upper clamp 14 is in front of the bow and is below section A. Clamp 14 with section C in front of the bow. Any pull on the bow is applied to section A and B to more or less lock the clamping means in place. As to clamp 16, any forward pull on the reel pushes section D against the back of the bow and pulls F against the front of the bow preventing it from being pulled off. It is thus seen that the harder the pull on the line, the better the clamps 14 and 16 function. This, of course, is most important.

I can also test the sight of my shooting to determine the effect of the position of the reel and the line which is pulled from the reel. If the drag on the line as the arrow goes through the air is such as to pull it up or down, I can compensate for that by moving the clamp up or down on the bow as the case may justify.

Attention is next directed to FIGS. 1 and 3 to show the shooting strap which is used in conjunction with the reel. Shown thereon is a base strap 60 which can be secured about the bow 10 by lacing 62. A D-ring 64 is provided through loop 66 which is attached to base strap 60. D-ring 64 can move up or down through loop 66 or it can pivot about the longitudinal axis of the loop 66. A wrist strap 68 is attached to D-ring 64 and is provided with a fastener such as a buckle 70. There is a D-ring on each side of the bow. When shooting the bow and arrow, by using the shooting strap, I can release the arrow without completely holding the hand around the bow itself. I can use just an open hand, index and thumb to secure the bow. When holding a bow with a closed hand the shooter will tend to flex the hand up or down, left or right when the arrow is released. This will greatly decrease the accuracy of the arrow. Shooting with an open hand also allows the bow to absorb its own release shock without transmitting it through the hand into the arm, etc. The shooting strap also prevents the bow from falling into the water as my wrist will hold it. By using this technique, the bow can float in the hands and increase accuracy and absorb its own shock load. I thus, do not hold the bow rigid in my hand.

Figures 8, 9:
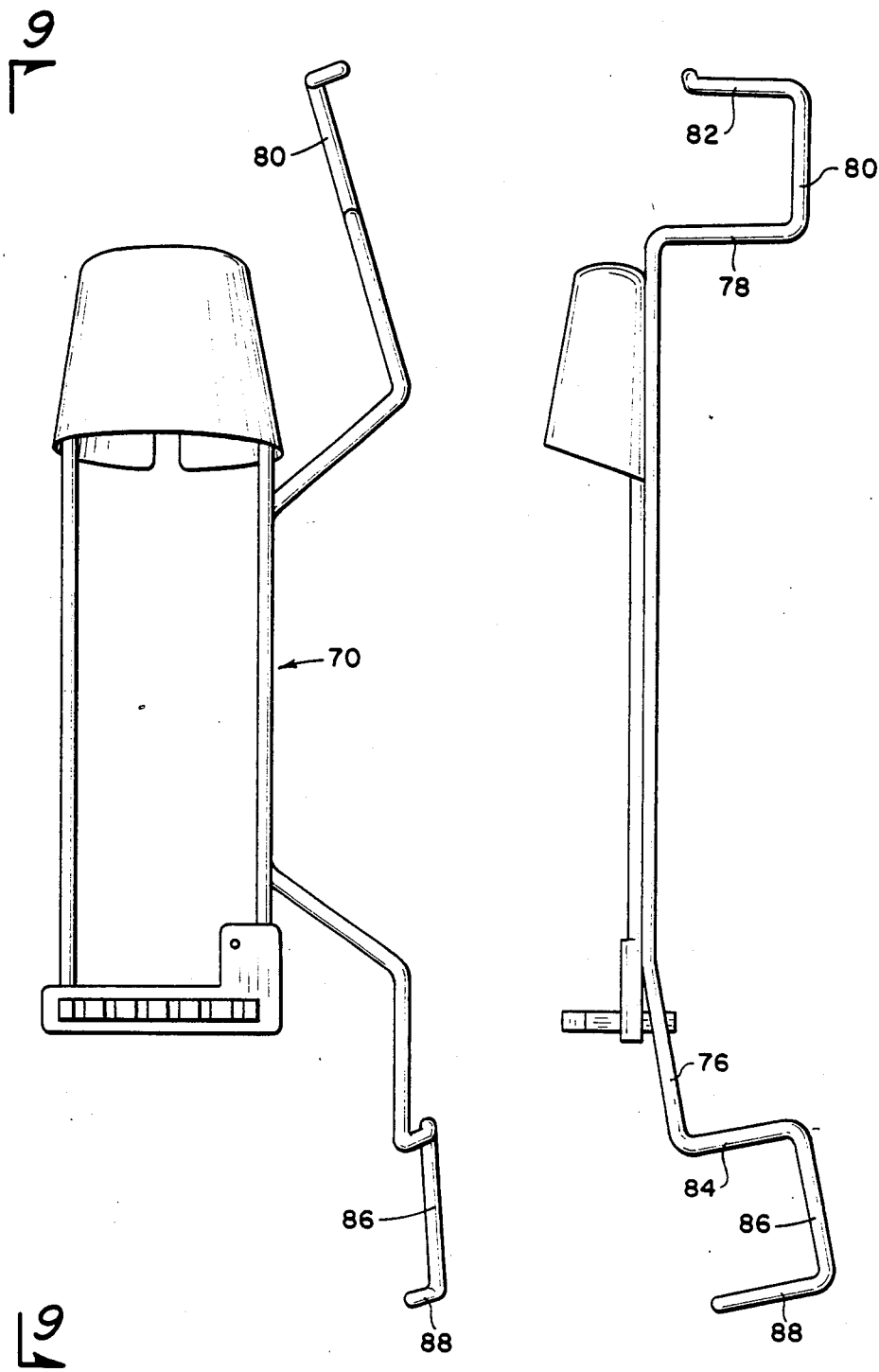
FIG. 8 is an enlarged view of the quiver clamp of FIG. 7.
FIG. 9 is a view taken along the line 9—9 of FIG. 8.

Attention will now be directed toward FIGS. 7, 8 and 9 which shows the aforementioned quiver holder. As can be seen clearly in FIG. 7, it includes a quiver holder 70 which has an upper clamp 72 and a lower clamp 74. As shown also in FIGS. 8 and 9, the lower clamp includes a first sect on 76, a second section 84 which is perpendicular thereto, a vertical section 86 and another horizontal section 88. The upper clamp means includes a horizontal section 78, a vertical section 80 and a upper section 82. As can be seen, the upper clamp which comprises sections 78, 80 and 82 is considerably different from upper clamp which comprises sections 78, 80 and 82 is considerably different from upper clamp 14 of my invention upon close scrutiny of the disclosure. It is seen then in FIG. 7 that section 82 is above section 78. That is section 82 is the part that goes in back of the bow limb. This is quite adequate for just merely holding a quiver, however, when it would not at all be appropriate to use this for a reel. The upper arm in this position frequently pops loose when the limb is moved back and forth as when releasing the arrow. This will allow no forward force on the clamp as is necessary when using the reel device shown in FIG. 1 of my invention. Only the lower arm in FIG. 7 would be trying to hold the clamp to the bow when a forward force is applied to the reel and the upper clamp would be pulled loose.

While this invention has been described with a certain degree of particularity, it is manifest than many changes may be made in the details of construction in the arrangement of components without departing from the spirit and scope of the disclosure. It is understood that the invention is not limited to the embodiment set forth herein for purposes of exemplification, but is limited only by the scope of the attached claim or claims, including the full range of equivalency to which each element thereof is entitled.

What is claimed:

1. A wire fastener having an upper clamp and a lower clamp comprising:
   a connecting section of wire;
   said upper clamp comprising:
      a first horizontal section;
      a vertical section at the outer end of said first horizontal section and making a right angle therewith in the direction of the lower clamp;
      a first extending section attached to the end of said vertical section and sloping in the direction of said connecting section of wire; and
   said lower clamp comprising:
      a second horizontal section;
      a second vertical section extending downwardly from said second horizontal section and making approximately a right angle therewith;
      a second extending section attached to said second vertical section and making an angle in excess of 90° therewith and sloping in a direction away from said upper clamp;

said connecting section of wire connecting said first horizontal section with said second horizontal section.

2. A wire fastener as defined in claim 1 in which said first extending section makes an angle of between about 30° to 45° with a line perpendicular with said vertical section.

3. A fastener as defined in claim 2 including a reel support bracket attached to said connecting section.

4. A fastener as defined in claim 3 in which said bracket includes a cradle for securing said reel and attachable to said connecting section, a first horizontal bracket section extending outwardly from said bracket; a vertical bracket section connected to said horizontal bracket section and a substantially horizontal section connection to said vertical bracket section and extending back to said connecting section.

* * * * *